US012590611B2

(12) United States Patent
Tarandek et al.

(10) Patent No.: US 12,590,611 B2
(45) Date of Patent: Mar. 31, 2026

(54) SYSTEM FOR PROVIDING A BRAKE FORCE

(71) Applicant: HL MANDO CORPORATION, Gyeonggi-do (KR)

(72) Inventors: Kristijan Tarandek, Neu-Isenburg (DE); Hansjoerg Feigel, Rosbach (DE)

(73) Assignee: HL MANDO CORPORATION, Gyeonggi-do (KR)

( * ) Notice: Subject to any disclaimer, the term of this patent is extended or adjusted under 35 U.S.C. 154(b) by 472 days.

(21) Appl. No.: 17/793,930

(22) PCT Filed: Jan. 22, 2021

(86) PCT No.: PCT/KR2021/000922
§ 371 (c)(1),
(2) Date: Jul. 20, 2022

(87) PCT Pub. No.: WO2021/150064
PCT Pub. Date: Jul. 29, 2021

(65) Prior Publication Data
US 2023/0056306 A1     Feb. 23, 2023

(30) Foreign Application Priority Data

Jan. 22, 2020   (DE) ..................... 10 2020 200 764.0

(51) Int. Cl.
*F16D 55/226*      (2006.01)
*F16D 65/18*       (2006.01)
(Continued)

(52) U.S. Cl.
CPC ........... *F16D 55/226* (2013.01); *F16D 65/18* (2013.01); *F16D 2121/04* (2013.01);
(Continued)

(58) Field of Classification Search
CPC .... F16D 65/18; F16D 2125/06; F16D 55/228; F16D 55/226; F16D 65/54;
(Continued)

(56) References Cited

U.S. PATENT DOCUMENTS 6,394,235 B1 * 5/2002 Poertzgen ............. F16D 55/227
                                                    303/3
8,776,958 B2 * 7/2014 Shiraki .................. F16D 65/567
                                                    188/71.9
(Continued)

FOREIGN PATENT DOCUMENTS

DE    102007053278 B4 * 11/2017   ............ B60T 13/745
DE    102008042778 B4 *  1/2020   ............ B60T 13/741
(Continued)

OTHER PUBLICATIONS

International Search Report for PCT/KR2021/000922 mailed on May 7, 2021 and its English Machine Translation by Google Translate (now published as WO 2021/150064).
(Continued)

*Primary Examiner* — Robert A. Siconolfi
*Assistant Examiner* — Mahbubur Rashid
(74) *Attorney, Agent, or Firm* — WOMBLE BOND DICKINSON (US) LLP

(57) ABSTRACT

The present invention relates to a system, comprising a transmission unit being arranged for converting a rotational motion into a translational motion, the transmission unit including an input and an output, wherein the input is configured to receive torque from a motor and the output is configured to provide a brake force for pressing a brake pad against a friction surface; a housing defining a hydraulic pressure chamber, wherein the housing at least partially encompasses the transmission unit; and (Continued)

an axially movable piston arranged in the housing and coupled to the transmission unit such that a translational motion of the piston causes a translational motion of the transmission unit for providing the brake force in a hydraulic operation mode.

11 Claims, 8 Drawing Sheets

(51) Int. Cl.
*F16D 121/04* (2012.01)
*F16D 121/24* (2012.01)
*F16D 125/06* (2012.01)
*F16D 125/40* (2012.01)

(52) U.S. Cl.
CPC ...... *F16D 2121/24* (2013.01); *F16D 2125/06* (2013.01); *F16D 2125/40* (2013.01)

(58) Field of Classification Search
CPC ......... F16D 2055/0016; F16D 2121/14; F16D 2121/24; F16D 2121/04; F16D 2125/40; F16D 55/224; F16D 65/0971; F16D 55/225; F16D 2125/58; F16D 65/097; F16D 2129/10; F16D 2131/00
See application file for complete search history.

(56) References Cited

U.S. PATENT DOCUMENTS

| | | | | |
|---|---|---|---|---|
| 10,167,914 | B2 * | 1/2019 | Hyun | .................... F16D 55/226 |
| 2005/0167211 | A1 * | 8/2005 | Hageman | ................ F16D 65/18 |
| | | | | 188/71.9 |
| 2007/0062769 | A1 * | 3/2007 | Noh | ...................... B60T 13/588 |
| | | | | 188/162 |
| 2017/0082159 | A1 * | 3/2017 | Son | ......................... F16D 65/18 |
| 2017/0356514 | A1 * | 12/2017 | Kim | .................... F16H 25/2018 |
| 2018/0038432 | A1 | 2/2018 | Blattert et al. | |
| 2019/0084544 | A1 * | 3/2019 | Severinsson | .......... B60T 13/741 |
| 2019/0100172 | A1 * | 4/2019 | Lee | ......................... B60T 7/042 |

FOREIGN PATENT DOCUMENTS

| | | | | |
|---|---|---|---|---|
| FR | 2931771 | A1 * | 12/2009 | |
| FR | 2999257 | A1 * | 6/2014 | .............. B60T 1/065 |
| JP | 11-93991 | | 4/1999 | |
| JP | 11-287269 | | 10/1999 | |
| KR | 101407468 | B1 * | 6/2014 | |
| KR | 101407469 | B1 * | 6/2014 | |
| KR | 10-2015-0128277 | | 11/2015 | |
| KR | 10-2018-0024364 | | 3/2018 | |

OTHER PUBLICATIONS

Written Opinion of the International Searching Authority for PCT/KR2021/000922 mailed on May 7, 2021 and its English Machine Translation by Google Translate (now published as WO 2021/150064).

* cited by examiner

【Figure 1】
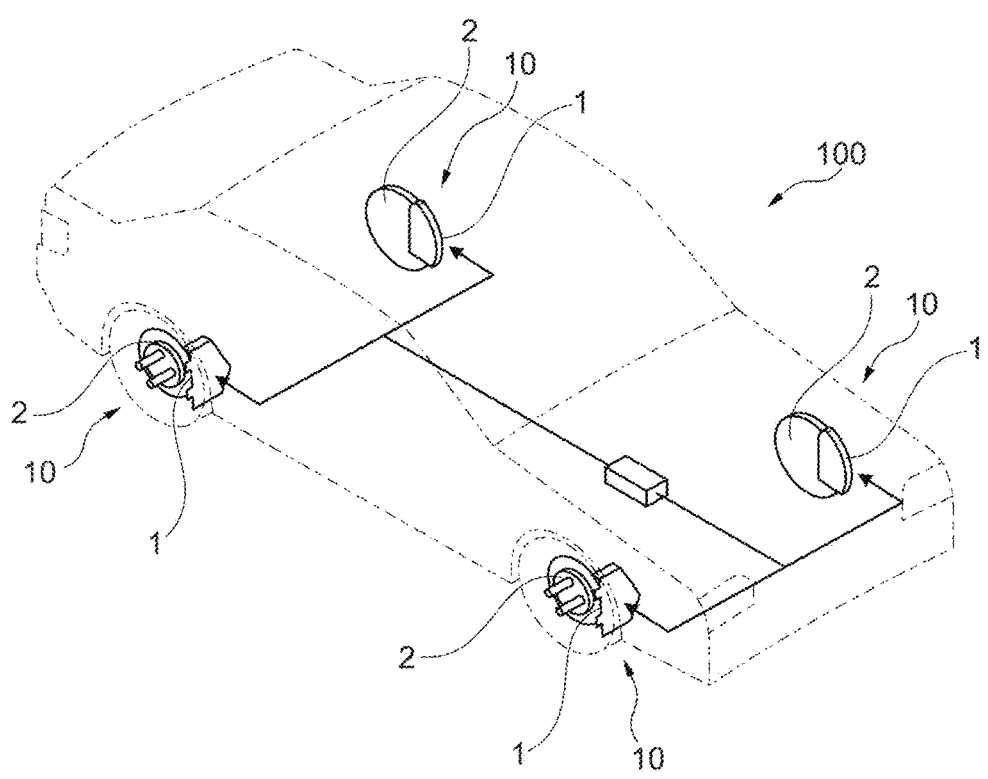

[Figure 2]
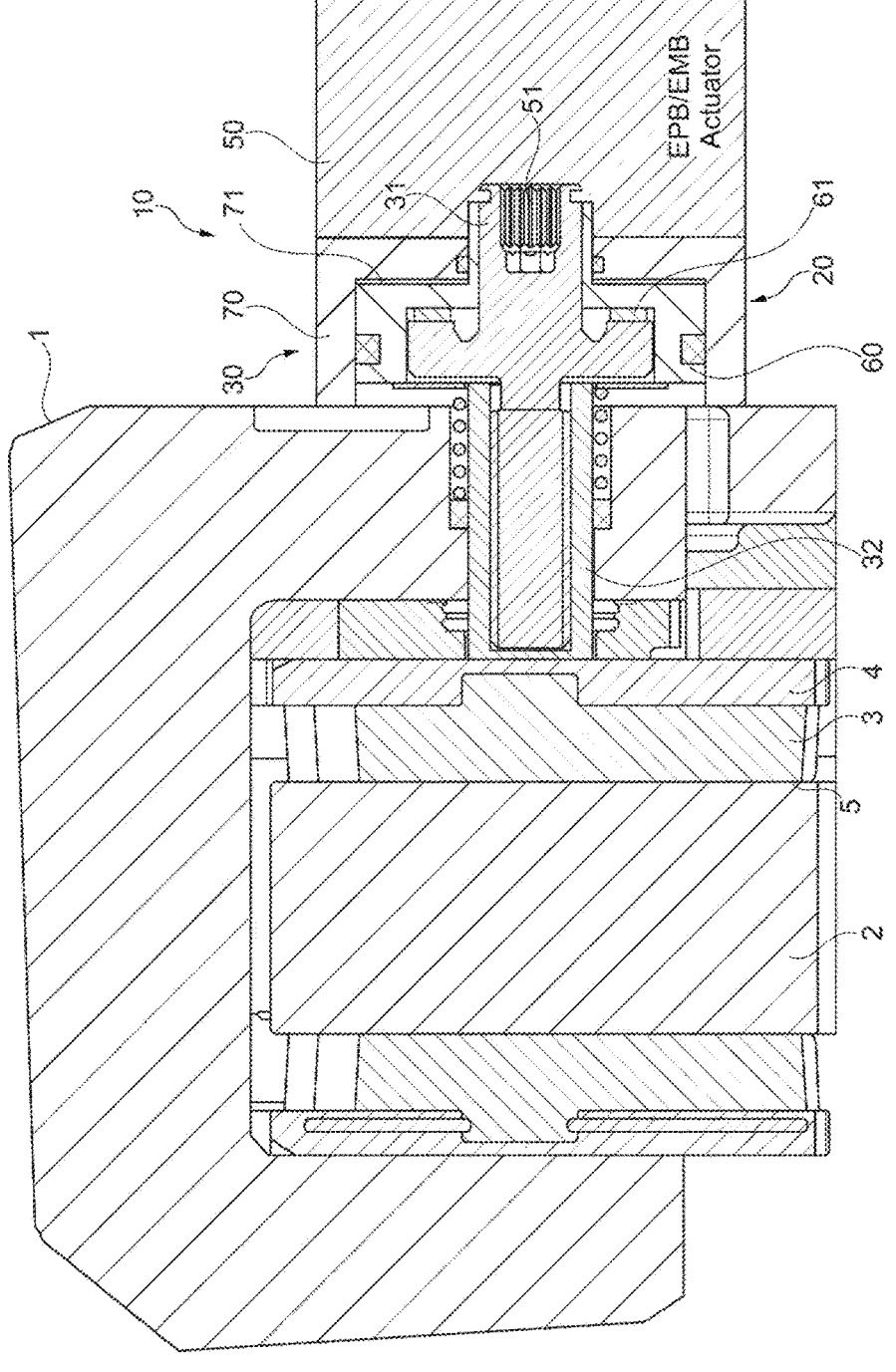

【Figure 3】
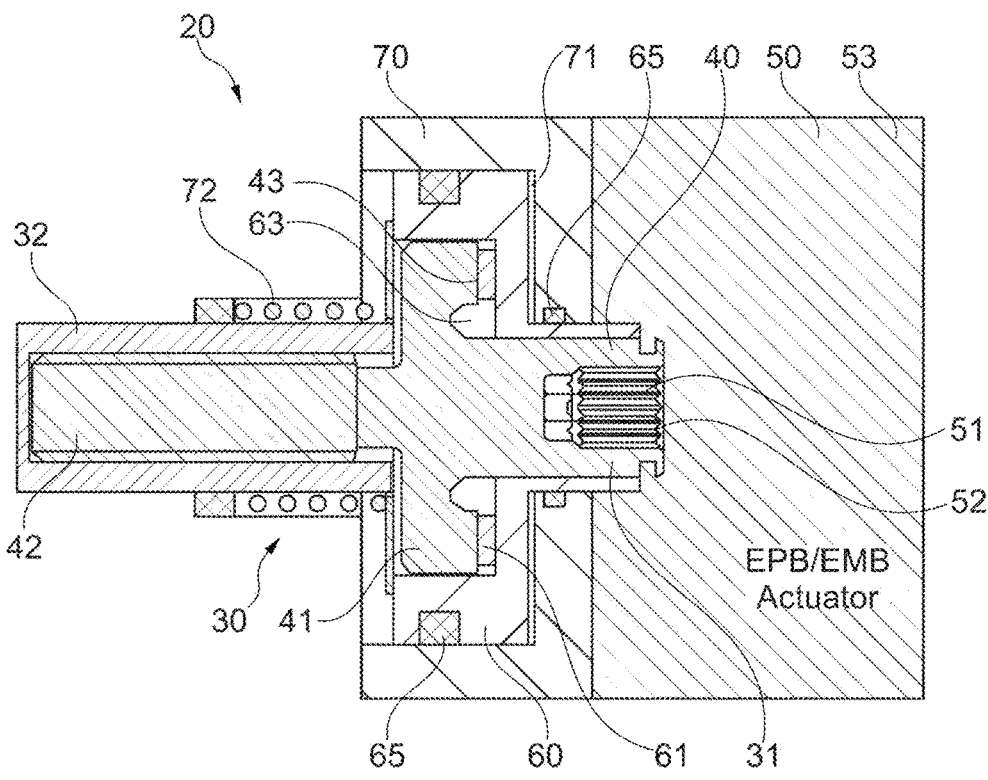

[Figure 4]
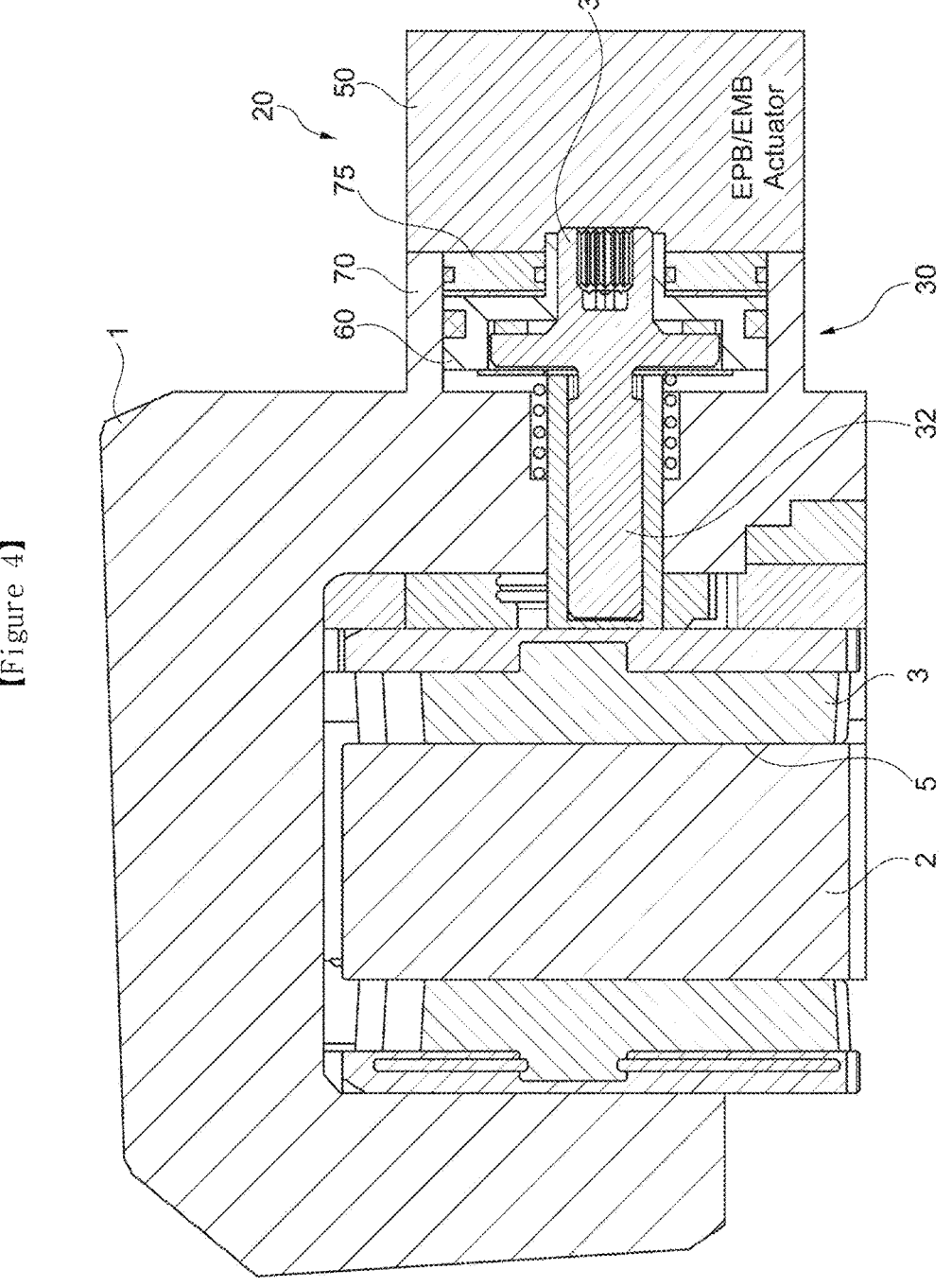

【Figure 5】
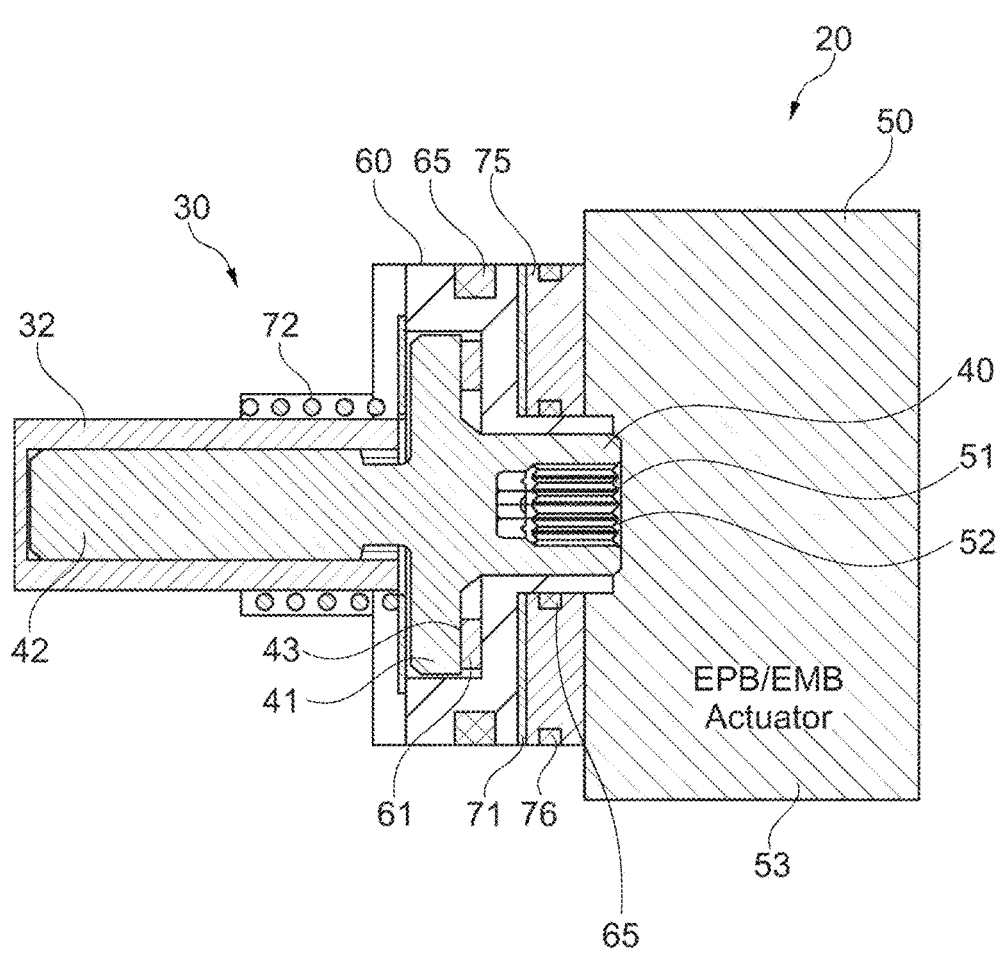

[Figure 6]
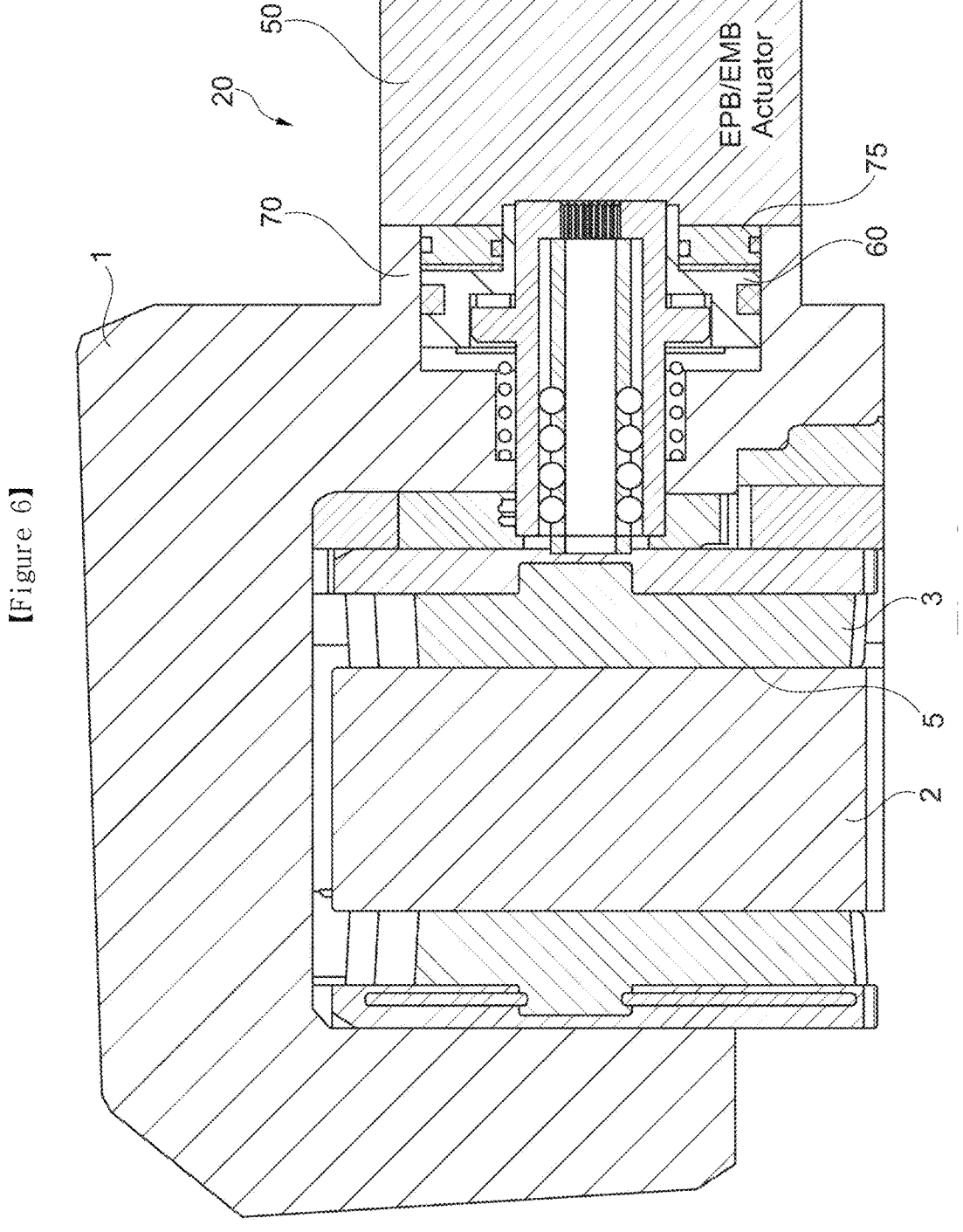

【Figure 7】
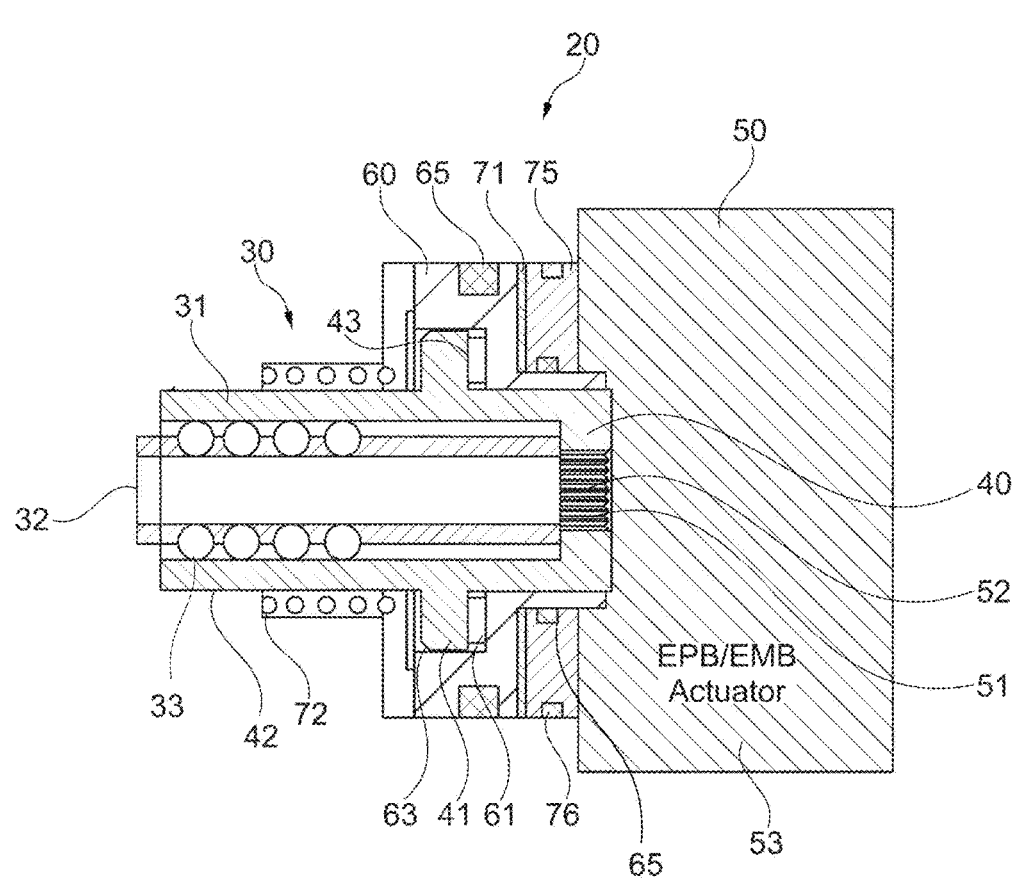

[Figure 8]
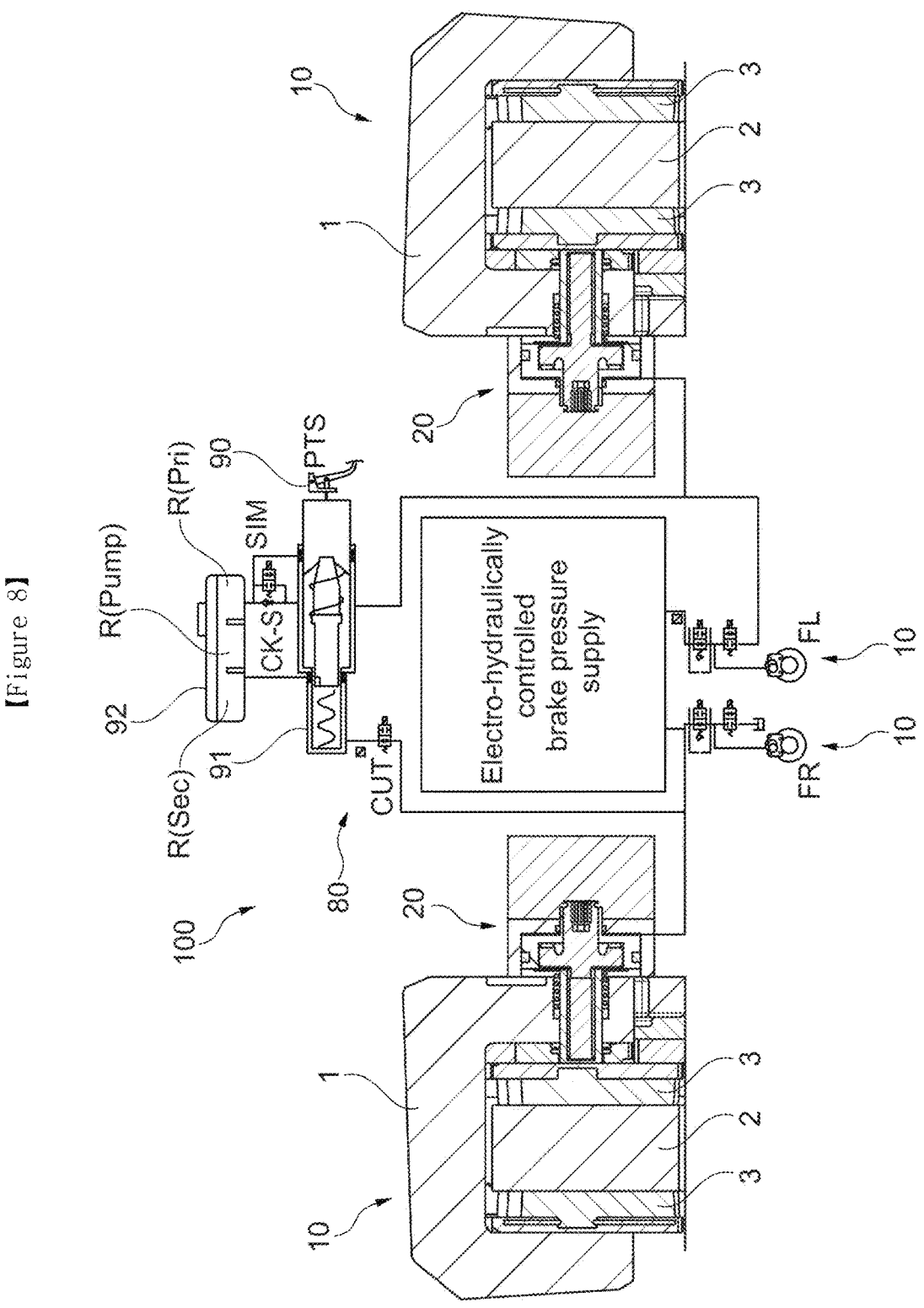

SYSTEM FOR PROVIDING A BRAKE FORCE

CROSS-REFERENCE TO RELATED APPLICATIONS

This application is the U.S. National Stage of International Patent Application No. PCT/KR2021/000922 filed on Jan. 22, 2021, which claims the priority to German Patent Application No. 10 2020 200 764.0 filed in the German Intellectual Property Office on Jan. 22, 2020, the entire contents of which are incorporated herein by reference.

TECHNICAL FIELD

The present invention relates to a system for providing a brake force for pressing a brake pad against a friction surface as wall as a brake system. More precisely, the invention relates to a system comprising a transmission unit, a housing and a piston, wherein the transmission unit converts a rotational motion into a translational motion to provide the required brake force.

BACKGROUND ART

Current hydraulic disc brakes are often designed in a way that brake pad wear can be compensated by a long stroke piston and additional brake fluid volume sucked into the long stroke calliper cylinder coming from a reservoir that is dimensioned for this additional brake fluid volume. It would be advantageous to reduce weight, volume and cost of such existing brake systems. Further, it would be beneficial if components (e.g. piston, cylinder and reservoir) can be reduced in size and the amount of necessary brake fluid can be reduced.

*4Conventional brake systems are designed in a way that the assembly of a piston, a spindle and other parts is performed from the inner side of the brake calliper and a motor is assembled from an outer side of the brake calliper. To reduce complexity in the assembly process, it would be advantageous if the assembly of the components is possible from only one side.

Furthermore, conventional hydraulic brake callipers may have specially designed features to reduce residual drag. One of these features is a roll back ring seal acting in a special shaped seal grove in order to pull back the piston after a braking action. Application of this function is linked with high mechanical development effort and can not be electronically adapted. Achieving low drag after application of an electronic parking brake (EPB) has been proven to be difficult.

Disc brakes may be operated hydraulically and/or electro-mechanically. To ensure the safety of the brakes, preferably redundant components are used. Up to now, introduction of a full electro-mechanical brake has been proven to be difficult due to a low installation rate of a redundant power net in vehicles. Therefore, to provide the desired redundancy, it has been proposed to use electro-mechanical brakes with a hydraulic fallback operation mode.

DISCLOSURE

Technical Problem

The present invention has been made to solve or mitigate at least one of the above described issues.

Technical Solution

According to the invention, this is achieved by a system in accordance with claim 1 and a brake system in accordance with claim 10. Further embodiments are described by the dependent claims and the following description.

According to claim 1, a system is provided comprising:

a transmission unit being arranged for converting a rotational motion into a translational motion, the transmission unit including an input and an output, wherein the input is configured to receive torque from a motor and the output is configured to provide a brake force for pressing a brake pad against a friction surface;

a housing defining a hydraulic pressure chamber, wherein the housing at least partially encompasses the transmission unit; and an axially movable piston arranged in the housing and coupled to the transmission unit such that a translational motion of the piston causes a translational motion of the transmission unit for providing the brake force in a hydraulic operation mode.

The motor provides a rotational motion that is converted by the transmission to a translational motion. The brake pad is pressed to the friction surface by the translational motion provided by the transmission. In this case, the system may operate in the electro-mechanic or electric operation mode. In case of a power net failure or a malfunction of the motor or other electric components or electrically actuated components of the brake system, the system can be operated in the hydraulic operation mode, which is sometimes called hydraulic fall-back mode or emergency mode. In the hydraulic operation mode, the hydraulic pressure chamber is pressurized which causes the piston to move axially. Since the transmission unit is coupled to the piston, the transmission unit will be also moved axially. In this way, the brake pad can be moved towards the friction surface.

The system may further comprise said motor. The motor may include an output shaft coupled to the input of the transmission unit. According to some exemplary embodiments, the input of the transmission unit is slidably arranged with respect to the output shaft of the motor. In some embodiments, the input of the transmission unit and the output shaft are rotatably connected by a splined connection. The motor may comprise a motor gear unit that is connected to the output shaft. Preferably, the motor is an electric motor, such as a DC motor or an AC motor.

Optionally, the motor is configured to adjust a size of a gap between the brake pad and the friction surface by driving the output shaft. For instance, the motor can be configured such that the size of said gap can be kept smaller than a predetermined value. In this way, the brake pad wear can be compensated without having to vary the stroke of the piston or the amount of braking fluid. To this end, at least one sensor can be provided that measures the size of the gap between the brake pad and the friction surface. Additionally or alternatively, a touch point sensor is provided that senses whether the brake pad touches the brake disc. In some embodiments, the motor is rotated in a test mode until the brake pad is pressed against the friction surface or until a touch point is sensed, e.g. by a suitable sensor. The rotations of the output shaft can be measured or counted by a rotation sensor. After the braking force is provided, the output shaft can be rotated back by a predetermined amount (e.g. 360°, 540°, 720° or another predetermined angle), wherein the predetermined amount corresponds to a predetermined or desired gap size. A controller may be envisaged that controls the motor, in particular based on the output received by the sensor(s). Setting or adjusting the size of the gap is prefer-
ably performed when the piston and the transmission are
both in a hydraulic rest position (see below).

In some embodiments, the output is or comprises a
pushing member for pressing the brake pad against the
friction surface. The pushing member can be arranged such
to directly abut the brake pad or a brake pad holder.

Optionally, at least a part of the transmission unit is
axially disposed between the piston and the brake pad.
Typically, the output of the transmission unit is axially
disposed between the piston and the brake pad. The trans-
mission unit may comprise a spindle and a nut. In some
embodiments, the input comprises a spindle and the output
comprises a nut. Alternatively, the input comprises a nut and
the output comprises a spindle. The spindle may be disposed
inside the nut. One of the spindle and the nut may be
rotatingly disposed relative to the other one. A threaded
connection may be provided for coupling the input and the
output of the transmission.

The system may further comprise a brake calliper for
receiving the brake pad. Typically, the brake calliper is
configured to receive two brake pads arranged on opposite
sides of a brake disc. In some instances, the housing is
connected to the brake calliper, e.g. by mechanical fasteners.
The housing, the piston and/or the motor may be arranged
outside of the brake calliper, while a part of the transmission
unit, e.g. the output, may protrude into the brake calliper. It
should be noted that the housing of the brake system does
not need to be a separate part. Instead, the housing can be an
integral part of the brake calliper. In this case, the housing
may protrude outwardly from the brake calliper, for instance
in an axial direction.

The system, preferably the output, may comprise an
anti-rotational feature for preventing rotation of the output.
The anti-rotational feature may be a radially extending
protrusion or a slot. The anti-rotation feature can be con-
nected to a non-rotating part of the system, such as the brake
calliper, the brake pad or the housing.

The system may further include a roller bearing disposed
between the trans-mission unit and the piston. The roller
bearing may enable rotation of the transmission unit without
rotating the piston. Preferably, the roller bearing is a needle
bearing. The roller bearing may directly contact the trans-
mission unit and/or the piston.

In some embodiments, an elastic member is provided
biasing the piston and/or the transmission unit towards a
hydraulic rest position. The volume of the hydraulic pressure
chamber may be minimal in the hydraulic rest position. The
elastic member may be a spring such as a coil spring. The
elastic member may ensure that the piston and/or the trans-
mission unit are pushed away from the brake pad when the
hydraulic pressure chamber is depressurized (i.e. in the
hydraulic rest position). In the electric operation mode, the
piston and/or the transmission unit are typically in the
hydraulic rest position.

The piston may encompass (i.e. enclose) at least a part of
transmission unit. For instance, the piston encompasses at
least a part of the input of the transmission unit. The piston
can be a ring piston. At least one seal member may be
disposed between the piston and the housing for sealing the
hydraulic pressure chamber. The hydraulic pressure cham-
ber may be connected via one or more hydraulic fluid lines
to a hydraulic brake circuit.

The system described above can be part of a brake system.
In some instances, the system is or comprises an electric
parking brake to be activated by the motor. Additionally or
alternatively, the system can be or comprise an electro-mechanical brake serving as a service brake. Additionally or
alternatively, the system can be or comprise a hydraulic
service brake to be activated by pressurizing a brake fluid
within the pressure chamber.

Further, a brake system is provided including the system
as described above.

Various objects and advantages of the present invention
will become apparent to those skilled in the art from the
following detailed description of embodiments, when read
in light of the accompanying drawings.

Advantageous Effects

According to the embodiments, since the transmission
unit transmits the brake force from the motor to the brake
pad or from the piston to the brake pad, the piston and the
housing can be manufactured in a particular short fashion as
compared to pistons according to conventional solutions that
directly provide a brake force to the brake pad (i.e. without
any intermediate parts). In this way, also less brake fluid is
needed.

Furthermore, all components can be assembled from the
outside of the brake calliper. Moreover, the system provides
a hydraulic fallback operation mode.

DESCRIPTION OF DRAWINGS

FIG. 1 shows schematically a perspective view of a
vehicle with a brake system.

FIG. 2 shows a cross-sectional view of a detail of the
brake system according to an embodiment.

FIG. 3 shows a cross-sectional view of a part of the brake
system according to FIG. 2.

FIG. 4 shows a cross-sectional view of a detail of the
brake system according to an embodiment.

FIG. 5 shows a cross-sectional view of a part of the brake
system according to FIG. 4.

FIG. 6 shows a cross-sectional view of a detail of the
brake system according to an embodiment.

FIG. 7 shows a cross-sectional view of a part of the brake
system according to FIG. 6.

FIG. 8 shows a schematic of a brake system according to
an embodiment.

BEST MODE

In the following, recurring and similar features in this and
in the subsequent representations are provided with the same
reference numerals.

The vehicle shown in FIG. 1 has four wheels and a wheel
brake 10 for each of the wheels. FIG. 1 shows a brake
calliper 1 and a brake disc 2 of each of these wheel brakes
10, which are of the disc brake type. The brakes 10 may be
activated not only electrically but also hydraulically. The
brakes 10 are part of a brake system 100 which combines
electric parking brakes (EPB) and electro-mechanic service
brakes with hydraulic service brakes.

*55FIG. 2 shows a detail of the disc brake 10. Generally,
the disc brake 10, includes brake calliper 1, brake disc 2
(sometimes called rotor), and two or more brake pads 3, such
as an inboard brake pad and outboard brake pad mounted
inside the brake calliper 1 on opposing sides of the brake
disc 2. The two or more brake pads 3 are mounted such that
they can move axially, parallel to the rotor axis, toward and
away from the brake disc 2. During a braking action the
brake pads 3 are pressed by a pushing member against the
brake disc 2. The brake pads 3 wear due to the friction with the brake disc 2 or another suitable friction surface resulting in a decreased thickness of the brake pads 3.

FIG. 2 also shows a subsystem 20 that is designed for providing the necessary brake force for pressing the brake pad 3 against the friction surface. The system 20 comprises a transmission unit 30, a piston 60 and a housing 70. The system 20 may further comprise a motor 50. Said system 20 (or subsystem 20) is also shown in FIG. 3.

The transmission unit 30 is arranged for converting a rotational motion of the motor 50 into a translational motion. To this end, the transmission unit 30 includes an input 31 and an output 32, wherein the input 31 is configured to receive torque from the motor 50 and the output 32 is configured to provide a brake force for pressing the brake pad 3 against the brake disc 2. Usually, the brake pad 3 is moved by the output 32 in an axial direction that is parallel to a longitudinal axis of the output 32 and/or parallel to a rotational axis of the brake disc 2.

The input 31 of the transmission unit 30 may be coupled to an output shaft 51 of the motor 50. According to some exemplary embodiments, the input 31 of the transmission unit 32 is slidably arranged with respect to the output shaft 51 of the motor 50. In some embodiments, the input 31 of the transmission unit 32 and the output shaft 51 are rotatably connected by a splined connection 52. The motor 50 may comprise a motor gear unit (not depicted) that is connected to the output shaft 51. Preferably, the motor 50 is an electric motor, such as a DC motor or an AC motor. The motor 50 further comprises a casing 53. Said casing 53 can be a metal casing or plastic casing and may house the motor gear unit and other components of the motor 50. The motor 50 may also be referred to as EPB/EMB actuator (electric park brake actuator or electro-mechanic brake actuator).

Optionally, the transmission unit 30 is at least partially axially disposed between the piston 60 and the brake pad 3. Typically, at least the output 32 of the transmission unit 30 is axially disposed between the piston 60 and the brake pad 3.

In some embodiments, the output 32 comprises or is a pushing member for pressing the brake pad against the friction surface. The pushing member can be arranged such to directly abut the brake pad 3 or a brake pad holder 4 arranged between the brake pad 3 and the pushing member 32. Thus, the brake pad 3 and the brake pad holder 4 do not contact or abut the piston 60. Both the output 32 and the input 31 comprise threaded portions that engage each other. By rotating the input 31 the output 32 is moved axially, e.g. towards the braking pad 3 during a braking action or away from the braking pad 3 upon brake release.

The system 20 further comprises an axially movable piston 60 that is mechanically coupled to the transmission unit 20 such that a translational motion of the piston 60 causes a translational motion of the transmission unit 30. It should be mentioned that the casing 53 of the motor 50 and the output shaft 51 of the motor 50 do not axially move when the piston 60 is moved axially. The piston 60 may encompass (i.e. enclose) at least a part of transmission unit 30. For instance, the piston 60 encompasses at least a part of the input 31 of the transmission unit. The piston 60 can be a ring piston having a receiving section 63 formed therein for receiving the input 31 of the transmission unit 30.

The system 20 may further include a roller bearing 61 axially disposed between the transmission unit 30 and the piston 60. The roller bearing 61 enables rotation of the transmission unit 30 without rotating the piston 60. Preferably, the roller bearing 61 is a needle bearing. However, the invention is not limited by any particular type of roller bearing. Other bearings that enable a rotation of the transmission unit 30 with respect to the piston 60 are also conceivable. As indicated in FIGS. 2-7, one side of the roller bearing 61 is coupled to the transmission unit 30, more specifically the input 31 thereof, and the other side of the roller bearing is coupled to the piston 60.

The housing 70 defines a hydraulic pressure chamber 71 that can be filled with brake fluid to axially move the piston 60. The hydraulic pressure chamber 71 may be delimited by the housing 70 and the piston 60. The housing 70 is configured to at least partially encompass (i.e. enclose) the transmission unit 30 and the piston 60. More specifically, the input 31 of the transmission 30 and the piston 60 are arranged within the housing 70.

The hydraulic pressure chamber 71 is connected via dedicated fluid lines to a hydraulic circuit 80 for supplying a pressurized brake fluid (see also FIG. 8). By pressurizing the hydraulic pressure chamber 71 the piston 60 can be moved in an axial direction. In some instances, the piston 60 will move towards the brake calliper 1 when the hydraulic pressure chamber 71 is filled with pressurized brake fluid. Since the transmission unit 30 is coupled to the piston 60, the transmission unit 30 will move along with the piston 60. In this way, the brake pad 3 can be moved towards the brake disc 2 even in case of a power net failure of a malfunction of the electric motor 50. Thus, in a hydraulic operation mode (sometimes called "emergency mode" or "hydraulic fall-back mode") the piston 60 provides the brake force via the transmission unit 30 for actuating the brake pad 3. In an electric or electro-mechanic operation mode, the motor 50 provides the brake force via the transmission unit 30 for actuating the brake pad 3. Said mode may be also referred to as "normal operating mode".

At least one seal member 65 may be disposed between the piston 60 and the housing 70. In the embodiment of FIGS. 2 and 3, two seal members 65 are provided 65, wherein the hydraulic pressure chamber 71 is located axially between the seal members 65. The at least one seal member 65 makes sure that the hydraulic fluid cannot escape from the hydraulic pressure chamber 71. In some instances, the seal member 65 is an O-ring that is arranged in a corresponding groove of either the piston 60 or the housing 70. The at least one seal member 65 is arranged such that it allows axial movement of the piston 60 in the hydraulic operation mode.

An elastic member 72 is configured to bias the piston 60 and the transmission unit 30 towards a hydraulic rest position. The elastic member 72 may be a spring such as a coil spring. The elastic member 72 may ensure that the piston 60 and/or the transmission unit 30 are pushed away from the brake pad 2 and the brake calliper 1 when the hydraulic pressure chamber 71 is depressurized. In the electric operation mode, the piston 60 and the transmission unit 30 are typically in the hydraulic rest position. The elastic member 72 may define an opening that receives the transmission unit 30.

The housing 70 functions as a cylinder for the piston 60. The housing 70 can be connected to the motor 50. For example, the housing 70 is connected to the casing 53 of the motor 50. According to some embodiments, the housing 70 is in direct contact with (i.e. abuts) the casing 53 of the motor 50.ss In the embodiment shown in FIGS. 2-3 and 8, the housing 70 is connected to the brake calliper 1 by mechanical fasteners such as screws. It should be noted that the housing 70 of the system 20 does not need to be a separate part. Instead, the housing 70 can be an integral part of the brake calliper 1, see the embodiments shown in FIGS. 4-7. In the embodiments shown in FIGS. 4-7 an additional cover element 75, such as a plate, disc or ring, is envisaged for closing the housing 70 formed by the brake calliper 1. A sealing member 76 may be disposed between the housing 70 and the cover element 75. In this case, the hydraulic pressure chamber 71 is delimited by the housing 70, the cover element 75 and the piston 60.

The system 20 may comprise an anti-rotational feature (not shown) for preventing rotation of the output 32, e.g. for preventing of the output 32 rotation relative to the calliper 1. The anti-rotation feature can be coupled to a non-rotating part of the system, such as the brake calliper 1, the brake pad 3 and/or the housing 70. For example, the anti-rotational feature may comprise a radially extending protrusion protruding into an elongated slot. Importantly, the anti-rotational feature should enable the output 32 to move axially.

The input 31 may have a first portion 40, a centre portion 41 and a second portion 42, wherein the first portion 40 and the second portion 42 are located on opposite sides of the input 31. Often, the first portion 40 is connected to the second portion 42 by the centre portion 41. The first and second portions 40, 42 may form end portions of the input 31, respectively. The first portion 40, the centre portion 41 and/or the second portion 42 may each have a different outer diameter. In particular, the outer diameter of the centre portion 41 exceeds the outer diameter of the first and second portions 40, 42. However, as shown in FIG. 7, the first and second portions 40, 42 may have a similar outer diameter. The centre portion 41 extends radially from an input axis (i.e. longitudinal axis of the input 31) and towards the piston 60. The centre portion 41 may be fully or at least partially disposed in the receiving section 63 of the piston 60. The input 31, or more specifically the centre portion 41, may define a bearing surface 43 which may extend in a radial direction, i.e. perpendicular to the longitudinal axis of the input 31. The roller bearing 61 may be connected and/or coupled to said bearing surface 43. The output shaft 51 of the motor 50 may axially protrude into a recess formed in the input 31. More specifically, the recess can be formed in the first portion 40 of the input 31. Both the recess and the output shaft 51 may include splines that matingly engage each other and form a splined connection 52. The second portion 42 is disposed in a dedicated bore of the brake calliper 1.

As can be seen from FIGS. 2-7, the input 31 and the output 32 of the transmission 30 can be implemented in various ways. According to the embodiment shown in FIGS. 2-5, the input 31 is embodied as a spindle 31. Further, in the embodiments shown in FIGS. 2-5, the output 32 can be a nut or sleeve receiving the spindle 31. Depending on the rotational direction of the spindle 31 the nut 32 (or sleeve) is moved towards the brake pad 3 or away from the brake pad 3. In the embodiment shown in FIGS. 6, 7 the input 31 is a nut (or sleeve) while the output 32 is embodied as spindle. As mentioned above, the both the output 32 and the input 31 may comprise threaded portions 33 that engage each other. In this way, rotation of the input 31 causes translational movement of the output 32.

The system described above can be part of a brake system 100 (see FIG. 8). In some instances, the system 20 is or comprises an electric parking brake to be activated by the motor 50. Additionally or alternatively, the system 20 can be or comprise an electro-mechanical brake serving as a service brake. Additionally or alternatively, the system 20 can be or comprise a hydraulic service brake to be activated by pressurizing a brake fluid within the hydraulic pressure chamber 71.

In FIG. 8 a brake system 100 is shown. The brake system 100 may include a hydraulic circuit 80, a brake pedal 90, a master cylinder 91 and a reservoir 92 for storing brake fluid. The hydraulic circuit 80 may connect the reservoir 92 to the hydraulic pressure chambers 71 of each disc brake 10 via a plurality of hydraulic fluid lines and dedicated valves, e.g. solenoid valves. An electro-hydraulically controlled brake pressure supply may provide hydraulic brake pressure, e.g. to the disc brakes 10 of the front right (FR) wheel and the rear left wheel. Alternatively, an electro-mechanical brake which provides a braking force only by motor may be applied to the front right (FR) wheel and the rear left wheel. Otherwise, a hydraulic brake which provides a braking force only by hydraulic pressure generated by the operation of the brake pedal may be applied to the front right (FR) wheel and the rear left wheel.

The remaining disc brakes 10 of the front left (FL) wheel and the rear right wheel may be provided with the subsystem 20 for providing a brake force. Other wheel combinations are also contemplated by the present invention. In some systems, each wheel of the vehicle is provided with a disc brake 10 including sub-system 20.

The system 20 and the system 100 are particularly suited for compensating break pad wear.

In some instances, the motor 50 is configured to adjust a size of a gap 5 between the brake pad and the friction surface for compensating break pad wear. To this end, the piston 60 and the transmission unit 30 should be in their hydraulic rest position. Then, the input 31 is rotated such that the output 31 is moved towards the brake pad 3. A touch point will be sensed, e.g. by a dedicated sensor. Now, the size of the gap 5 can be set by rotating the input 32 a predefined angle. Notably, the size of the gap 5 is set without moving the piston 60. In other words, the brake pad wear can be compensated without having to vary the stroke of the piston 60 or the amount of braking fluid. The process may be performed after release of the electric park brake (EPB). The motor 50 can be configured such that the size of said gap 5 can be kept smaller than a predetermined value. Once the gap 5 is calibrated it remains more or less stable until pad wear adjustment is needed or an EPB actuation is performed. A controller may be envisaged that controls the motor, in particular based on the input from the sensor mentioned.

Thus, the gap 5 (sometimes called air gap) can be electronically adjusted after EPB actuation. In addition, the brake 10 can be activated electro-mechanically for normal service brake function and can be activated hydraulically in case of power net failure for hydraulic fall back function. This allows that in case of a power net failure in a rear axle EMB system still all four wheels can be activated or in case of a full EMB no redundant power net is needed, because a hydraulic fall back will be available for one or two axles.

Thus, according to some embodiments of the invention pad wear can be compensated by the system 20.

Since the transmission unit 30 transmits the brake force from the motor to the brake pad 3 or from the piston 60 to the brake pad 3, the piston 60 and the housing 70 (cylinder 70) can be manufactured in a particular short fashion as compared to pistons according to conventional solutions that directly provide a brake force to the brake pad (i.e. without any intermediate parts). In this way, also less brake fluid is needed.

Furthermore, as can be seen from FIGS. 2-8 all components 20, 30, 60, 50 can be assembled from the outside of the brake calliper 1. Moreover, the system 20 provides a hydraulic fallback operation mode.

It is clear for a skilled person that any features shown in the FIGS. 1-8 may be combined with each other or may be separately claimed as long as they do not contradict each other.

The invention claimed is:

1. A system, comprising a transmission unit being arranged for converting a rotational motion into a translational motion, the transmission unit including an input and an output, wherein the input is configured to receive torque from a motor and the output is configured to provide a brake force for pressing a brake pad against a friction surface;

a housing defining a hydraulic pressure chamber, wherein the housing at least partially encompasses the transmission unit; and an axially movable piston arranged in the housing and coupled to the transmission unit such that a translational motion of the piston causes a translational motion of the transmission unit for providing the brake force in a hydraulic fall-back mode; and a roller bearing disposed between the input and the piston, wherein the bearing is configured to enable a rotating movement of the transmission's input relative to the piston, wherein at least the output of the transmission unit is axially disposed between the piston and the brake pad and is disposed to press the brake pad directly, wherein the input of the transmission unit is disposed to entirely pass through the piston and the hydraulic pressure chamber, and wherein the piston comprises a receiving section in which the input of the transmission unit is received.

2. The system according to claim 1, further comprising said motor, the motor including an output shaft coupled to the input of the transmission unit.

3. The system according to claim 2, wherein the input of the transmission unit and the output shaft are rotatably connected by a splined connection.

4. The system according to claim 2, wherein the input of the transmission unit is slidably arranged with respect to the output shaft of the motor.

5. The system according to claim 2, wherein the motor is configured to adjust a size of a gap between the brake pad and the friction surface by driving the output shaft.

6. The system according to claim 1, wherein at least a part of the transmission unit is axially disposed between the piston and the brake pad and/or wherein the piston encompasses at least a part of the input of the transmission unit.

7. The system according to claim 1, further comprising a brake caliper for receiving the brake pad, wherein the housing is an integral part of the brake caliper or wherein the housing is connected to the brake caliper.

8. The system according to claim 1, further comprising an elastic member biasing the piston and/or the transmission unit towards a hydraulic rest position.

9. A brake system, comprising the system according to claim 1.

10. The brake system according to claim 9, the system is configured to provide the brake force to two wheels, other two wheels are provided with a braking force by any one of an electro-mechanical brake, a hydraulic brake and an electro-hydraulic brake for providing.

11. A system, comprising a motor including an output shaft;

a transmission unit being arranged for converting a rotational motion into a translational motion, the transmission unit including an input coupled to the output shaft and an output, wherein the input is configured to receive torque from the motor and slidably arranged with respect to the output shaft and the output is configured to provide a brake force for pressing a brake pad against a friction surface;

a housing defining a hydraulic pressure chamber, wherein the housing at least partially encompasses the transmission unit;

an axially movable piston arranged in the housing and moved by pressurized brake fluid filled in the hydraulic pressure chamber, wherein the piston encompassed at least a part of the input of the transmission unit such that a translational motion of the piston causes a translational motion of the input and the output for providing the brake force in a hydraulic operation mode; and a roller bearing disposed between the input and the piston, wherein the bearing is configured to enable a rotating movement of the transmission's input relative to the piston, wherein at least the output of the transmission unit is axially disposed between the piston and the brake pad and is disposed to press the brake pad directly, wherein the input of the transmission unit is disposed to entirely pass through the piston and the hydraulic pressure chamber, and wherein the piston comprises a receiving section in which the input of the transmission unit is received.

* * * * *